United States Patent
Furuichi et al.

(10) Patent No.: US 9,025,796 B2
(45) Date of Patent: May 5, 2015

(54) VIBRATION GENERATOR

(71) Applicant: Nidec Seimitsu Corporation, Ueda-shi, Nagano-ken (JP)

(72) Inventors: Keisuke Furuichi, Ueda (JP); Tomohiro Akanuma, Ueda (JP)

(73) Assignee: Nidec Seimitsu Corporation, Ueda-shi (JP)

( * ) Notice: Subject to any disclaimer, the term of this patent is extended or adjusted under 35 U.S.C. 154(b) by 69 days.

(21) Appl. No.: 13/790,775

(22) Filed: Mar. 8, 2013

(65) Prior Publication Data
US 2013/0272550 A1    Oct. 17, 2013

(30) Foreign Application Priority Data
Apr. 16, 2012  (JP) ................................. 2012-093309

(51) Int. Cl.
*H04R 25/00* (2006.01)
*H04M 19/04* (2006.01)
*H04R 1/00* (2006.01)
*H02K 41/00* (2006.01)

(52) U.S. Cl.
CPC .............. *H04R 1/00* (2013.01); *H04M 19/047* (2013.01)

(58) Field of Classification Search
CPC ... H04M 19/047; H04R 13/0002; H04R 9/00; H04R 9/025; H04R 9/06; H04R 9/10; H04R 2400/03
USPC ......... 381/162, 396, 412, 421, 150, 386, 388, 381/334; 310/15, 17, 20, 21, 25, 36–39, 29; 318/114
See application file for complete search history.

(56) References Cited

U.S. PATENT DOCUMENTS

| | | | |
|---|---|---|---|
| 5,682,132 A | 10/1997 | Hiroyoshi et al. | |
| 5,894,263 A * | 4/1999 | Shimakawa et al. | ........ 340/388.1 |
| 6,777,895 B2 * | 8/2004 | Shimoda et al. | .............. 318/114 |
| 2003/0117223 A1 | 6/2003 | Shimoda et al. | |
| 2011/0018369 A1 | 1/2011 | So | |

FOREIGN PATENT DOCUMENTS

| | | |
|---|---|---|
| AU | 2002348669 A1 | 6/2003 |
| CN | 101964566 A | 2/2011 |
| JP | 9-117721 A | 5/1997 |
| JP | 2003-93968 A | 4/2003 |
| JP | 2003-154314 A | 5/2003 |
| JP | 2011-25221 A | 2/2011 |
| KR | 10-2011-0010408 A | 2/2011 |
| WO | 03/044938 A1 | 5/2003 |

* cited by examiner

*Primary Examiner* — Curtis Kuntz
*Assistant Examiner* — Sunita Joshi
(74) *Attorney, Agent, or Firm* — Westerman, Hattori, Daniels & Adrian, LLP

(57) ABSTRACT

A vibration generator includes a coil arranged to generate magnetic fields, a ring-shaped yoke arranged to amplify an electromagnetic force generated by the magnetic fields in cooperation with the coil, a vibrating body arranged radially inward of the coil to move in a thrust direction, a ring-shaped magnet arranged in an outer peripheral portion of the vibrating body and opposed to the coil, and a spring arranged to support the vibrating body on at least one side of the vibrating body in thrust-direction.

13 Claims, 11 Drawing Sheets

VIBRATION GENERATOR

BACKGROUND OF THE INVENTION

1. Field of the Invention

The present invention relates to a vibration generator. In the vibration generator of the present invention, a coil and a magnet are arranged along a radial direction. A vibrating body is vibrated in a thrust direction by an interaction between the coil and the magnet.

2. Description of the Related Art

A portable terminal such as a cellular phone or the like includes a vibration generator arranged therein. The vibration generator generates vibration to thereby notify a user of arrival of an incoming call. Different types of vibration generators are available. As one example, there is available a vibration generator in which a vibrating body is vibrated in a thrust direction by an interaction of magnetic fields generated by a coil and a magnet. There have heretofore been proposed various kinds of vibration generators in which a vibrating body is vibrated in a thrust direction.

Japanese Patent Application Publication No. 2003-93968 discloses a vibration generator in which a coil and a magnet are arranged side by side along a radial direction. The vibration generator includes a pair of brackets for holding a fixed shaft in an outer end portion of a frame made of a magnetic material. The vibration generator includes a coil wound only in one direction and arranged on an inner circumferential surface of the frame. The vibration generator includes a permanent magnet arranged in a spaced-apart relationship with the coil to magnetically interact with the coil and a vibrating body formed of a bearing. The vibrating body is arranged between the brackets and is held on the fixed shaft through a spring so that the vibrating body can move in the axial direction.

Japanese Patent Application Publication No. 2003-154314 discloses a vibration generator in which a coil and a magnet are arranged side by side along a radial direction. The vibration generator includes an outer yoke portion having a magnet. The vibration generator further includes an inner yoke portion having a coil portion arranged in an opposing relationship with the outer yoke portion to generate vibration-purpose magnetic fields. The vibration generator further includes a leaf spring for interconnecting the inner yoke portion and the outer yoke portion. The leaf spring is assembled at a balance position of the outer yoke portion in an extended state.

However, the vibration generator disclosed in Japanese Patent Application Publication No. 2003-93968 suffers from reduced vibration efficiency because the vibrating body is vibrated with the Lorentz force by directly applying magnetism to the coil. The vibrating body is supported by coil springs arranged at the opposite sides thereof. With this structure, the percentage of the coil springs in the vibration generator becomes larger, making it impossible to reduce the size of the vibration generator.

The magnetic circuit of the vibration generator disclosed in Japanese Patent Application Publication No. 2003-154314 is formed into an outer magnet structure in which the magnet is arranged radially outward of the coil. In this outer magnet structure, the percentage of the inner yoke portion in the internal space of the vibration generator grows larger. Moreover, the volume of the coil cannot be increased in the outer magnet structure. Thus, the vibrating body is caused to vibrate at desired acceleration and amplitude through the use of a high-performance magnet. For that reason, the vibration generator of outer magnet structure becomes less cost-effective.

SUMMARY OF THE INVENTION

The present invention provides a vibration generator capable of increasing the internal space of the vibration generator in a cost-effective manner, securing a large enough vibration quantity in a vibrating body and easily controlling the vibration of the vibrating body.

In accordance with an aspect of the present invention, there is provided a vibration generator, including: a coil arranged to generate magnetic fields; a ring-shaped yoke arranged to amplify an electromagnetic force generated by the magnetic fields in cooperation with the coil; a vibrating body arranged radially inward of the coil to move in a thrust direction; a ring-shaped magnet arranged in an outer peripheral portion of the vibrating body and opposed to the coil; and a spring arranged to support the vibrating body on at least one side of the vibrating body in the thrust-direction.

The magnetic circuit of the present invention is formed into an inner magnet structure in which the magnet is arranged radially inward of the coil. For that reason, it is possible to increase the radius and circumferential length of the coil and to widen the region positioned inward of the coil. Since the magnetic circuit is formed into the inner magnet structure, it becomes possible to increase the volume of the coil. Inasmuch as the magnet is arranged in the outer peripheral portion of the vibrating body, it is possible to increase the volume of the magnet. This makes it possible to lower the performance of the magnet. Use of the low-performance magnet makes it possible to reduce the cogging force by which the magnet is attracted toward a specified portion of the coil, and to reduce the variation of the cogging force. Since the variation of the cogging force is made small, the resonance frequency is kept constant. Accordingly, it is possible to easily control the vibration of the vibrating body and to smoothly vibrate the vibrating body.

The vibration generator of the present invention has the following features. The present vibration generator includes a peripheral wall surface arranged radially outward of the coil to surround a periphery of the coil. In the present vibration generator, the yoke includes an inner peripheral wall covering an inner circumferential surface of the coil and a pair of end surface portions extending from opposite sides of the inner peripheral wall in the thrust-direction toward the peripheral wall surface. In the present vibration generator, the end surface portions make contact with the peripheral wall surface. The inner peripheral wall includes an opening portion arranged to interconnect a radial inner side and a radial outer side of the inner peripheral wall. The opening portion is formed over an entire circumference of the inner peripheral wall in a position corresponding to a center of amplitude of the vibrating body.

In the present invention, the peripheral wall surface can be caused to serve as the magnetic circuit because the end surface portions of the yoke make contact with the peripheral wall surface. For that reason, the yoke can be formed into a compact shape. This makes it possible to widen the region positioned radially inward than the yoke.

In the vibration generator of the present invention, the yoke includes an inner peripheral wall covering an inner circumferential surface of the coil, an outer peripheral wall covering an outer circumferential surface of the coil and a pair of end surface portions arranged at opposite ends of the yoke in the thrust-direction to interconnect the inner peripheral wall and the outer peripheral wall. In the vibration generator of the present invention, the inner peripheral wall includes an opening portion arranged to interconnect a radial inner side and a radial outer side of the inner peripheral wall. The opening portion is formed over an entire circumference of the inner peripheral wall in a position corresponding to a center of amplitude of the vibrating body.

In the present invention, it is possible to form the yoke into a compact and simple structure because the yoke is composed of the inner peripheral wall, the outer peripheral wall and the end surface portions.

The vibration generator of the present invention has the following features. The present vibration generator includes a housing including an end plate serving as a bottom surface and a case capped on the end plate. The case includes the peripheral wall surface arranged radially outward of the coil and a top surface arranged to cover a top portion of the vibration generator. In the present vibration generator, the end surface portions of the yoke are interposed between the end plate and the top surface of the case.

In the present invention, the end surface portions of the yoke are interposed between the end plate and the top surface of the case. For that reason, there is no need to additionally install a fixing configuration for fixing the yoke and the coil surrounded by the yoke in a specified position. This makes it possible to simplify the configuration of the vibration generator and to widen the region positioned radially inward of the yoke.

In the vibration generator of the present invention, a thrust-direction dimension of the yoke is larger than a thrust-direction dimension of the magnet.

In the present invention, the coil and the yoke can apply a thrust force to the vibrating body over a broader range in the thrust direction because the thrust-direction dimension of the yoke is larger than the thrust-direction dimension of the magnet.

The vibration generator of the present invention includes a shaft extending in the thrust direction, the vibrating body arranged to slide along the shaft in the thrust direction.

In the present invention, due to the provision of the shaft extending in the thrust direction, the posture of the vibrating body is kept horizontal by the shaft. This makes it possible to smoothly vibrate the vibrating body.

In the present invention, it is possible to increase the radius and circumferential length of the coil and to widen the region positioned inward of the coil. Since the region positioned inward of the coil can be formed wider, it becomes possible to increase the radial dimension of the vibrating body. Furthermore, it is possible to increase the volume of the coil and to form the vibrating body through the use of a magnet having a large volume. Thus, the performance of the magnet can be set lower. For that reason, it is possible to reduce the cogging force by which the magnet is attracted toward a specified portion of the coil, and to reduce the variation of the cogging force. As a consequence, the resonance frequency is kept constant. This makes it possible to easily control the vibration of the vibrating body and to smoothly vibrate the vibrating body. In addition, it is possible to use a low-performance magnet, which assists in reducing the cost.

The above and other features, elements, steps, characteristics and advantages of the present invention will become more apparent from the following detailed description of preferred embodiments of the present invention with reference to the attached drawings.

DETAILED DESCRIPTION OF THE PREFERRED EMBODIMENTS

Figure 1:
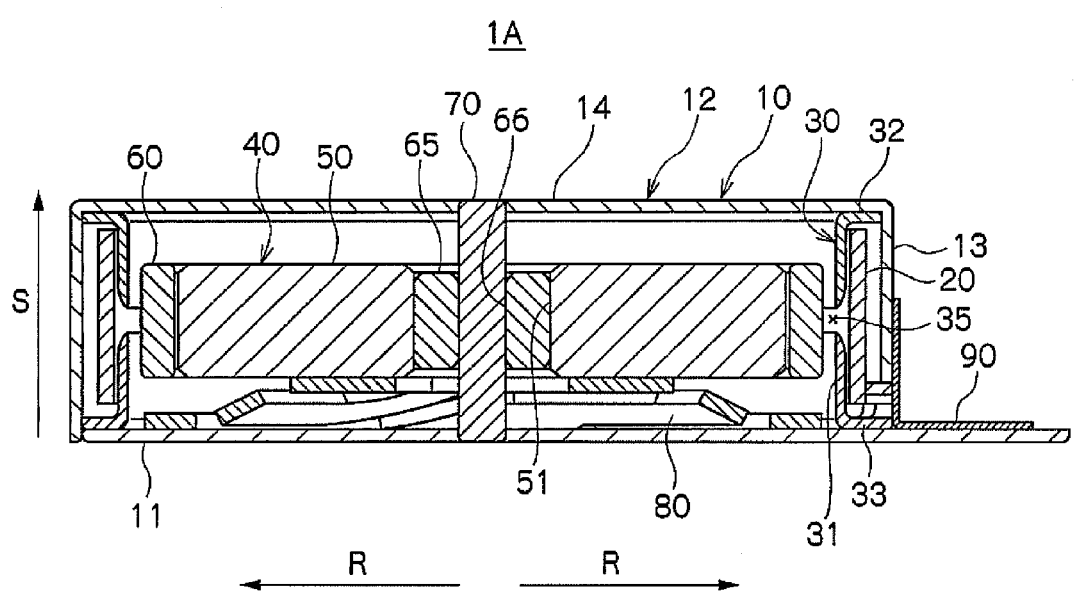
FIG. 1 is a vertical section view showing an internal structure of a vibration generator according to a first preferred embodiment of the present invention.
Figure 2:
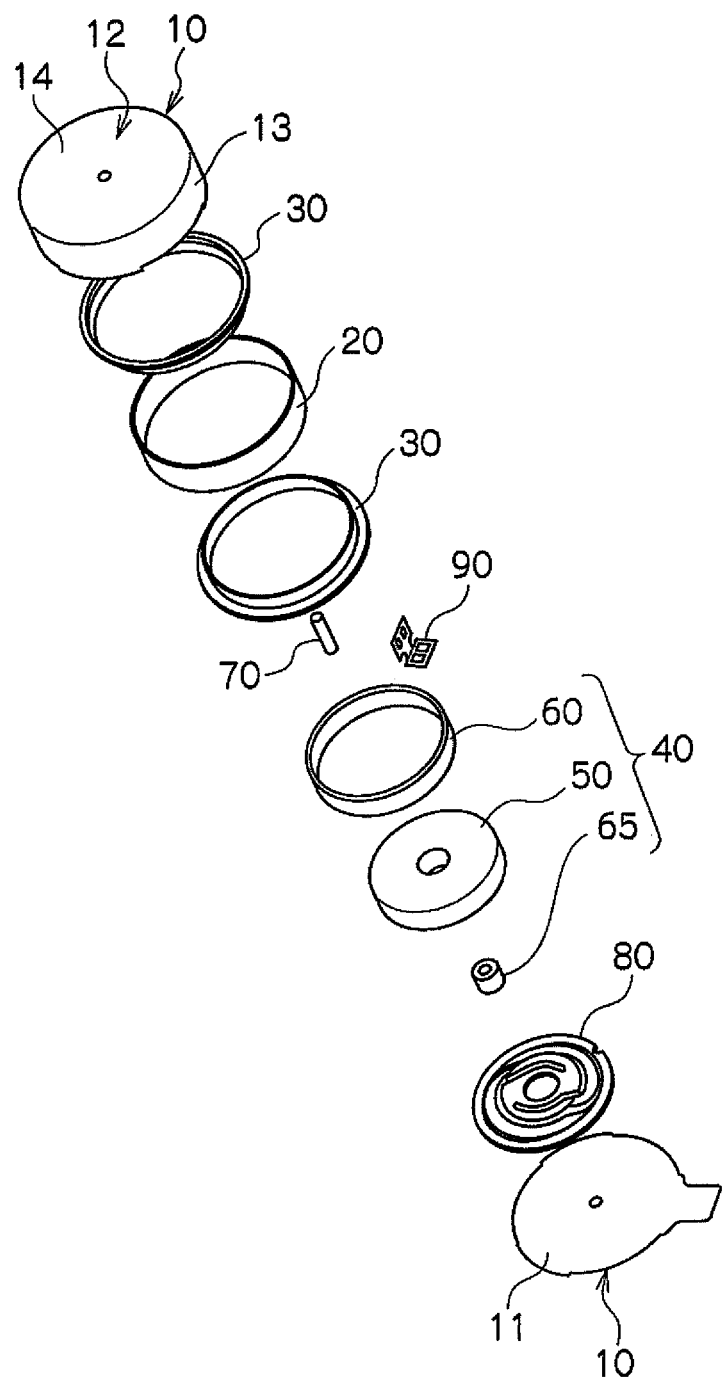
FIG. 2 is an exploded perspective view of the vibration generator shown in FIG. 1.

Preferred embodiments of the present invention will now be described with reference to the accompanying drawings which form a part hereof. The technical scope of the present invention is not limited to the following description and the accompanying drawings.

(Basic Configuration)

A vibration generator 1A, 1B, 1C, 1D or 1E according to the present invention includes a coil 20 arranged to generate magnetic fields, a ring-shaped yoke 30 or 130 arranged to amplify an electromagnetic force generated by the magnetic fields in cooperation with the coil 20, a vibrating body 40 or 140 arranged radially inward of the coil 20 to vibrate in a thrust direction, a ring-shaped magnet 60 or 160 arranged in an outer peripheral portion of the vibrating body 40 or 140 and opposed to the coil 20, and a spring 80 arranged on at least one thrust-direction side of the vibrating body 40 or 140 to support the vibrating body 40 or 140. The yoke 30 or 130 is provided in the coil 20.

In the vibration generator 1A, 1B, 1C, 1D or 1E, it is possible to increase the radius and circumferential length of the coil 20 and to widen the region positioned inward of the coil 20. Since the region positioned inward of the coil 20 can be formed wider, it becomes possible to increase the radial dimension of the vibrating body 40 or 140. Thus, there is provided an effect specific to the present invention in that it is possible to increase the volume of the coil 20 and to arrange the magnet 60 or 160 having a large volume in the vibrating body 40 or 140. Since the vibrating body 40 or 140 can be formed through the use of the magnet 60 or 160 having a large volume, it becomes possible to set low the performance of the magnet 60 or 160. For that reason, it is possible to reduce the cogging force by which the magnet 60 or 160 is attracted toward a specified portion of the coil 20, and to reduce the variation of the cogging force. As a consequence, the resonance frequency is kept constant. This makes it possible to obtain an effect specific to the present invention in that it is possible to easily control the vibration of the vibrating body 40 or 140 and to smoothly vibrate the vibrating body 40 or 140. In addition, the use of the low-performance magnet 60 or 160 makes it possible to reduce the cost.

The vibration generator 1A, 1B, 1C, 1D or 1E according to the present invention can be divided into a structure in which, as in the vibration generator 1A, 1B or 1D, a shaft 70 is arranged to allow a vibrating body 40 to vibrate along the shaft 70 and a structure in which, as in the vibration generator 1C or 1E, a shaft 70 is not arranged. Moreover, the vibration generator 1A, 1B, 1C, 1D or 1E can be divided into a structure in which, as in the vibration generator 1A, 1B or 1C, a spring 80 for supporting a vibrating body 40 or 140 is arranged on only one thrust-direction side of the vibrating body 40 or 140 and a structure in which, as in the vibration generator 1D or 1E, springs 80 are arranged on thrust-direction opposite sides of the vibrating body 40 or 140. The yoke 30 or 130 arranged in the coil 20 can be classified into a structure in which a yoke 30 is formed to cover only the inner circumferential surface and the thrust-direction opposite ends of a coil 20 and a structure in which a yoke 130 is formed to cover the entire circumference of a coil 20. Detailed configurations of the vibration generator 1A, 1B, 1C, 1D or 1E will now be described on an embodiment-by-embodiment basis. In the respective embodiments, the term "radial direction" means a radius direction of the vibration generator 1A, 1B, 1C, 1D or 1E. The term "thrust direction" denotes a height direction of the vibration generator 1A, 1B, 1C, 1D or 1E.

First Embodiment

A vibration generator 1A according to a first preferred embodiment of the present invention will be described in detail with reference to FIGS. 1 through 7. The radius direction of the vibration generator 1A designated by reference symbol R in FIG. 1 is a radial direction. The height direction of the vibration generator 1A designated by reference symbol S in FIG. 1 is a thrust direction.

The vibration generator 1A preferably includes a housing 10 serving as an outer shell. The housing 10 preferably includes an end plate 11 serving as a bottom surface of the vibration generator 1A and a case 12 capped on the end plate 11. The case 12 is one-piece formed by an annular peripheral wall surface 13 surrounding the periphery of the vibration generator 1A and a top surface 14 covering the top portion of the vibration generator 1A. The case 12 is made of a magnetic material.

Within the housing 10, there are accommodated an annular coil 20 arranged to generate magnetic fields, a yoke 30 arranged on an inner circumferential surface of the coil 20 to amplify an electromagnetic force generated by the magnetic fields in cooperation with the coil 20, a vibrating body 40 arranged radially inward of the coil 20, a shaft 70 arranged at a radial center of the vibration generator 1A and a spring 80 arranged to support the vibrating body 40 in the thrust direction.

The coil 20 is arranged inside the peripheral wall surface 13 of the case 12 with a minute gap left between the coil 20 and the peripheral wall surface 13. The coil 20 is formed into an annular shape by winding an element wire. The coil 20 surrounds the periphery of the vibrating body 40 arranged inward of the coil 20. The coil 20 is formed to have a reduced thickness. The thrust-direction dimension of the coil 20 is a little smaller than the thrust-direction dimension of the case 12.

In cooperation with the coil 20, the yoke 30 amplifies the electromagnetic force generated by the magnetic fields. The yoke 30 is formed into an annular shape by a thin magnetic material. The yoke 30 preferably includes an inner peripheral wall 31 covering the inner surface of the coil 20 and a pair of end surface portions 32 and 33 extending from the thrust-direction opposite ends of the inner peripheral wall 31 toward the peripheral wall surface 13 of the case 12. The end surface portions 32 and 33 preferably includes an upper end surface portion 32 arranged near the top surface 14 of the case 12 to extend from the end portion of the inner peripheral wall 31 toward the peripheral wall surface 13 and a lower end surface portion 33 arranged near the end plate 11 to extend from the end portion of the inner peripheral wall 31 toward the peripheral wall surface 13. The tip end of the upper end surface portion 32 and the tip end of the lower end surface portion 33 make contact with the peripheral wall surface 13 of the case 12. An opening portion 35 is formed at the thrust-direction center of the inner peripheral wall 31. The opening portion 35 is formed over the entire circumference of the yoke 30. The upper end surface portion 32 and the lower end surface portion 33 of the yoke 30 are interposed between the end plate 11 and the top surface 14 of the case 12, whereby the yoke 30 is fixed in a specified position.

In the structures of the case 12, the coil 20 and the yoke 30 described above, the yoke 30 and the peripheral wall surface 13 of the case 12 are magnetized with the magnetic fields generated from the coil 20. For that reason, the peripheral wall surface 13 of the case 12 serves as a magnetic circuit. The yoke 30 can be made of thin flat magnetic material. This makes it possible to widen the region positioned radially inward of the yoke 30.

The shaft 70 is arranged at the radial center of the housing 10 to extend in the thrust direction. One axial end of the shaft 70 is arranged in the end plate 11. The other axial end of the shaft 70 is arranged on the top surface 14 of the case 12. The shaft 70 serves to keep horizontal the posture of the vibrating body 40 when the vibrating body 40 vibrates in the thrust direction.

The vibrating body 40 preferably includes a weight 50, a magnet 60 attached to the outer peripheral portion of the weight 50 and a bearing 65 arranged at the radial center of the weight 50. The vibrating body 40 is vibrated in the thrust direction by the magnetic fields generated from the coil 20 and the magnetic fields generated from the magnet 60.

The weight 50 is formed into a disc shape to have a specified thickness. The thickness of the weight 50 is smaller than the thrust-direction dimension of the yoke 30. The weight 50 is formed to have a desired weight depending on the kinds of portable terminals employing the vibration generator 1A.

The magnet 60 is formed into an annular shape and is fitted to the outer peripheral portion of the weight 50. The thrust-direction dimension of the magnet 60 is smaller than the thrust-direction dimension of the yoke 30. For that reason, the coil 20 and the yoke 30 can appropriately apply a thrust force to the vibrating body 40 even when the vibrating body 40 is moved to a maximum amplitude position. The thrust-direction dimension of the yoke 30 is preferably set equal to or larger than the amplitude of the vibrating body 40.

The outer circumferential surface of the magnet 60 is opposed to the inner peripheral wall 31 of the yoke 30 over the entire circumference. The gap between the outer circumferential surface of the magnet 60 and the inner peripheral wall 31 of the yoke 30 is uniformly formed over the entire circumference. The outer circumferential surface of the magnet 60 is opposed to the inner circumferential surface of the coil 20 across the yoke 30 over the entire circumference with a specified gap left therebetween. As stated above, the magnetic circuit of the vibration generator 1A is formed into an inner magnet structure.

An attachment hole 51 is defined at the radial center of the weight 50. The attachment hole 51 extends through the thickness of the weight 50. The bearing 65 is fitted into the attachment hole 51. The bearing 65 is formed into an annular shape. A slide hole 66 extending in the thrust direction is defined at the radial center of the bearing 65. The shaft 70 is inserted through the slide hole 66. The inner circumferential surface of the slide hole 66 makes sliding contact with the outer circumferential surface of the shaft 70 when the vibrating body 40 vibrates in the thrust direction. The vibrating body 40 is supported in the thrust direction by the spring 80 installed on the end plate 11.

The spring 80 is formed by spirally winding a flat spring material. The spring 80 is a volute spring having a truncated conical contour. The spring 80 is formed such that the winding radius of the spring material is gradually decreased as the spring material extends from the radial outer side toward the center and such that the central portion of the spring 80 protrudes in the thrust direction. The radial outer portion of the spring 80 is fixed to the end plate 11. The central portion of the spring 80 is arranged on the vibrating body 40. The supporting structure of the vibrating body 40 is a cantilever structure in which the vibrating body 40 is supported only at the side of the end plate 11 by the spring 80.

When supported by the spring 80, the vibrating body 40 is positioned at the amplitude center in the thrust direction. If the vibrating body 40 is supported by the spring 80, the thrust-direction center of the magnet 60 comes into alignment with the position of the opening portion 35 formed in the yoke 30.

Figure 3:
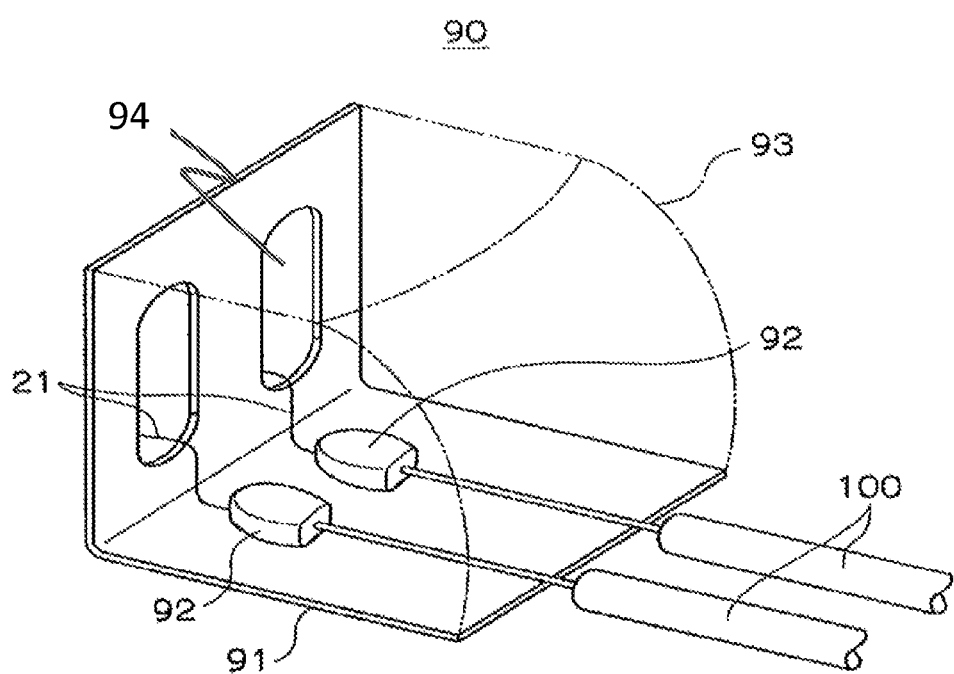
FIG. 3 is a perspective view schematically showing a connecting portion.

As shown in FIG. 3, the vibration generator 1A includes a connecting portion 90 arranged outside the housing 10. The connecting portion 90 has a hole 94. The connecting portion 90 is a portion where two lead wires 21 extending from the coil 20 are soldered and connected to the wiring lines 100 extending from a power source. The connecting portion 90 preferably includes a FPC (flexible printed circuit) 91 and a cover 93 covering the FPC 91. The FPC 91 is a circuit board and is preferably composed of a film-shaped insulating body having a thickness of from about 12 μm to about 50 μm, an adhesive agent layer formed on the insulating body and a conductive foil formed on the adhesive agent layer and having a thickness of from about 12 μm to about 50 μm. The FPC 91 preferably includes solder portions 92. The region of the surface of the FPC 91 other than the solder portions 92 is covered with the insulating body. For the sake of easier description, only the solder portions 92 are shown in FIG. 3.

The lead wires 21 of the coil 20 pass through the holes joining the inside and outside of the case 12 and extend to the FPC 91. The two lead wires 21 extending from the coil 20 and the wiring lines 100 extending from the power source for supplying an electric current to the coil 20 are connected to each other by the solder portions 92 of the FPC 91.

In the vibration generator 1A configured as above, if an electric current flows through the coil 20, magnetic fields are generated in the coil 20 and the yoke 30. A force for moving the vibrating body 40 in the thrust direction is applied to the vibrating body 40 by the magnetic fields generated in the coil 20 and the yoke 30 and by the magnetic fields generated in the magnet 60 attached to the vibrating body 40. Since the vibrating body 40 is supported by the spring 80 in the thrust direction, the vibrating body 40 is vibrated in the thrust direction by the force received from the magnetic fields and by the force received from the spring 80. Inasmuch as the thrust-direction dimension of the yoke 30 is larger than the thrust-direction dimension of the magnet 60, the coil 20 and the yoke 30 can apply a desired thrust force to the vibrating body 40 when the vibrating body 40 vibrates in the thrust direction.

As the vibrating body 40 resonates, the vibration generator 1A can effectively notify a user of arrival of an incoming call. For that reason, the vibration generator 1A is preferably configured such that the vibrating body 40 can resonate. The value of an electric current flowing through the coil 20, the weight of the weight 50 arranged within the vibration generator 1A, the magnetic force of the magnet 60 fitted to the weight 50 and the spring constant of the spring 80 are set in advance so that the vibrating body 40 can resonate appropriately.

The magnetic circuit of the vibration generator 1A is formed into an inner magnet structure in which the magnet 60 is arranged radially inward of the coil 20. In the inner magnet structure, the magnet 60 is arranged in the outer peripheral portion of the vibrating body 40. It is therefore possible to widen the region positioned radially inward of the yoke 30. For that reason, it becomes possible to increase the radial dimension of the vibrating body 40. Since the radial dimension of the vibrating body 40 can be increased, it is possible to increase the volume of the magnet 60. The magnet 60 having an increased volume can form magnetic fields over a broad range. For that reason, even if the vibrating body 40 is formed of a low-performance magnet 60, the magnet 60 is easily affected by the magnetic fields generated from the coil 20 and the yoke 30.

In the meantime, the coil 20 is arranged outside the vibrating body 40 having the magnet 60. The coil 20 arranged outside the magnet 60 has an increased radius and an increased circumferential length. For that reason, the volume of the coil 20 grows larger. The coil 20 and the yoke 30 extending long in the circumferential direction can generate strong magnetic fields over a broad range. This enables the coil 20 to appropriately vibrate the vibrating body 40 in the thrust direction.

Next, description will be made on the relationship between a decrease in the performance of the magnet 60 and a cogging force generated in the vibrating body 40.

Figure 4A:
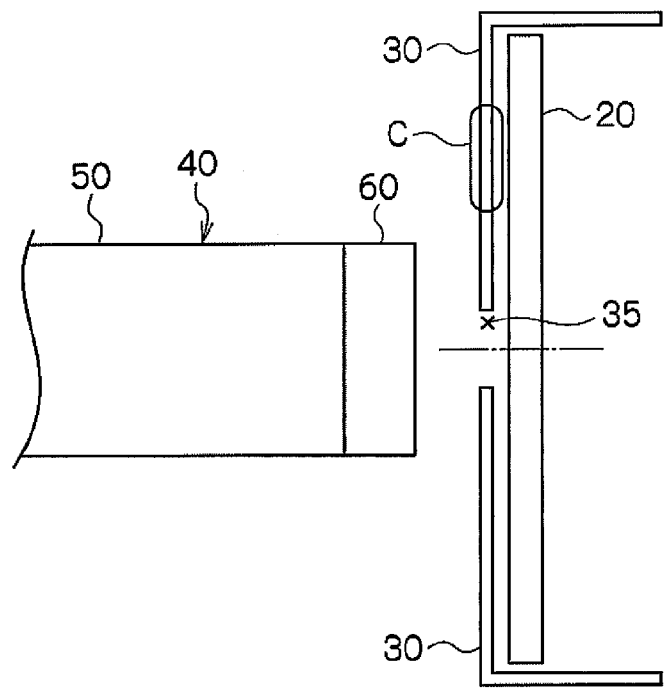
FIGS. 4A and 4B are explanatory model views illustrating the positional relationship between a vibrating body provided with a magnet and a coil surrounded by a yoke.
Figure 4B:
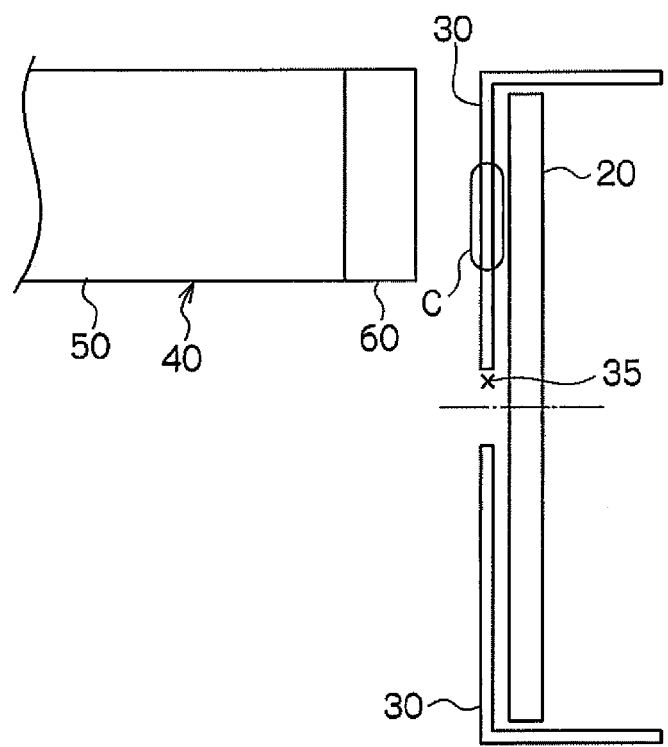

FIGS. 4A and 4B are model views illustrating the positional relationship between the vibrating body 40 provided with the magnet 60 and the coil 20 surrounded by the yoke 30. FIG. 4A shows the vibrating body 40 positioned at the amplitude center. FIG. 4B shows the vibrating body 40 moved to a maximum amplitude position.

When the vibrating body 40 is moved to above the amplitude center, the magnet 60 arranged in the vibrating body 40 tends to be attracted toward the middle portion C of the upper region of the yoke 30. Therefore, when the vibrating body 40 is moved upward from the amplitude center as shown in FIG. 4A, a lifting force acts on the magnet 60. If the vibrating body 40 passes by the middle portion C of the upper region of the yoke 30 as shown in FIG. 4B, a dragging-down force acts on the magnet 60. This is called a cogging force. In other words, the term "cogging force" means a force by which the magnet 60 is attracted toward a specified portion of the coil 20 and the yoke 30.

If compared to the spring 80, the cogging force corresponds to a spring constant. The cogging force varies with the amplitude of the vibrating body 40. The resonance frequency of the vibrating body 40 is changed depending on the variation of the cogging force. If the resonance frequency of the vibrating body 40 is changed, the vibration characteristic of the vibrating body 40 becomes nonlinear. This makes it difficult to control the vibration of the vibrating body 40.

If a high-performance magnet is employed in the vibrating body 40, the variation of the cogging force becomes larger. On the contrary, if a low-performance magnet 60 is employed in the vibrating body 40, the variation of the cogging force becomes smaller. For that reason, it is preferable to use the low-performance magnet 60 in order to reduce the variation of the cogging force. The vibration generator 1A according to the present invention employs the coil 20 having an increased volume and the magnet 60 having an increased volume. This makes it possible to lower the performance of the magnet 60. Consequently, it is possible to reduce the variation of the cogging force.

Next, a difference in the variation of the cogging force in case of a high-performance magnet and incase of a low-performance magnet will be described with reference to FIG. 5 through 7.

Figure 5:
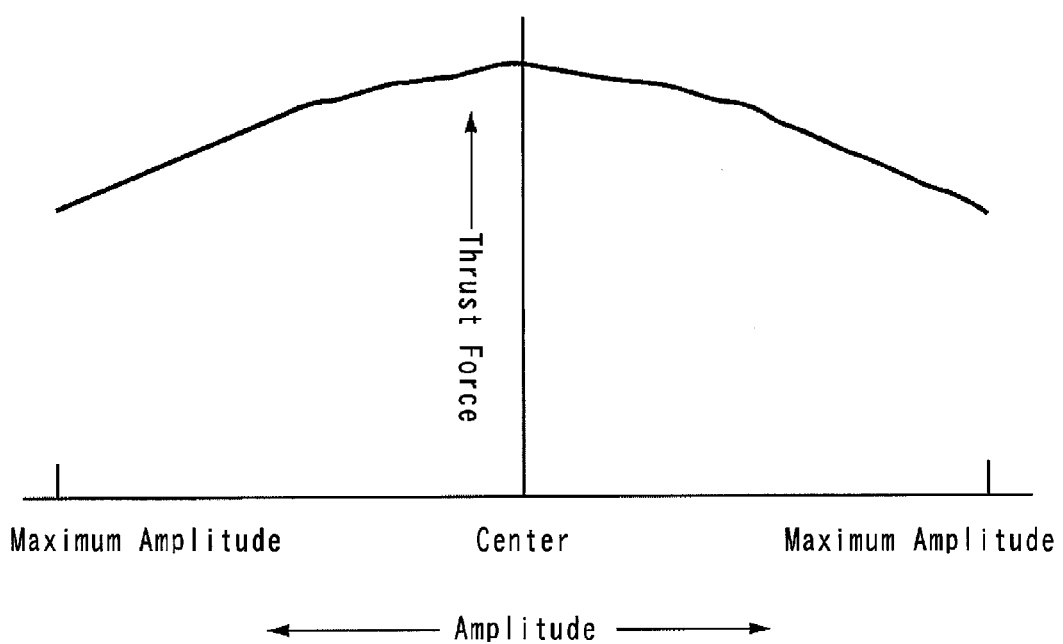
FIG. 5 is a graph representing the relationship between the thrust force acting on the vibrating body provided with the magnet and the amplitude of the vibrating body.

FIG. 5 is a graph representing the relationship between the thrust force applied by the interaction of the coil 20 and the yoke 30 and the amplitude of the vibrating body 40. In FIG. 5, the horizontal axis indicates the amplitude of the vibrating body 40 and the vertical axis indicates the thrust force. The center of the horizontal axis indicates the amplitude center. The opposite ends of the horizontal axis indicate the maximum amplitude positions. As shown in FIG. 5, the thrust force becomes largest at the amplitude center and grows gradually smaller as the vibrating body 40 moves toward the maximum amplitude positions.

Figure 6:
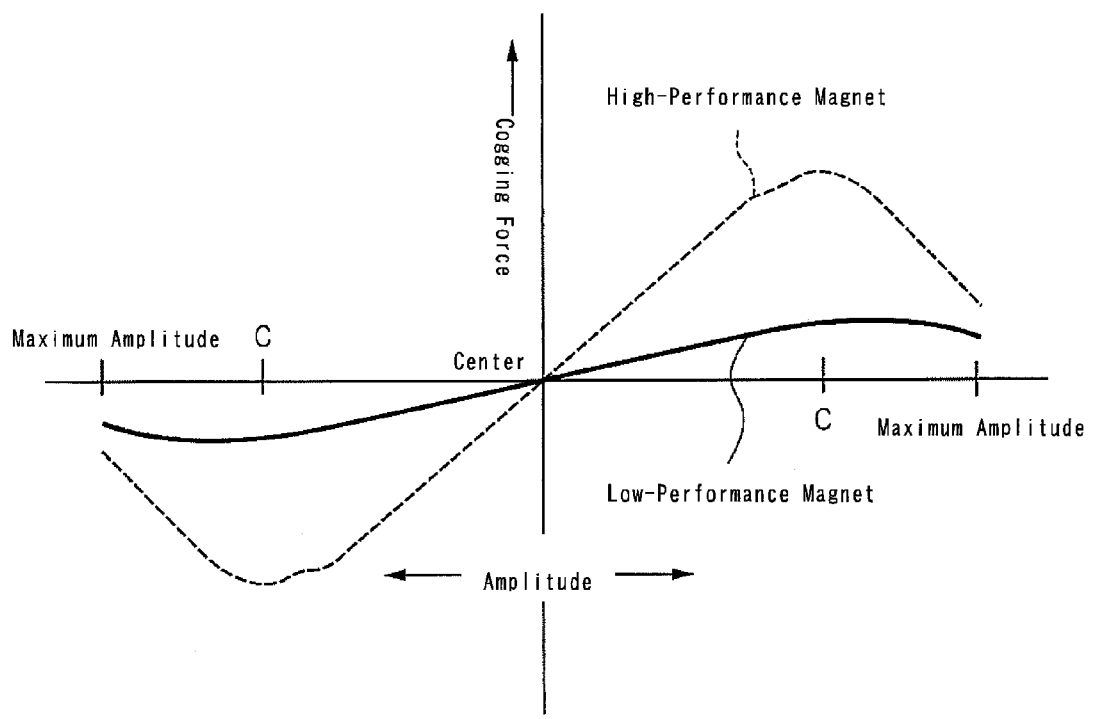
FIG. 6 is a graph representing the relationship between the cogging force generated in the vibrating body and the amplitude of the vibrating body, which compares the use of a high-performance magnet with the use of a low-performance magnet.

FIG. 6 is a graph representing the relationship between the amplitude of the vibrating body 40 and the cogging force. In FIG. 6, the horizontal axis indicates the amplitude of the vibrating body 40 and the vertical axis indicates the cogging force. The center of the horizontal axis indicates the amplitude center. The opposite ends of the horizontal axis indicate the maximum amplitude positions. The broken line curve indicates the use of a high-performance magnet. The solid line curve indicates the use of a low-performance magnet 60.

As shown in FIG. 6, the cogging force is not generated at the amplitude center. As the vibrating body 40 moves from the amplitude center to each of the maximum amplitude positions, the cogging force grows gradually larger and becomes largest in the position of the middle portion C between the amplitude center and each of the maximum amplitude positions. As the vibrating body 40 moves from the middle portion C to each of the maximum amplitude positions, the cogging force grows gradually smaller. The cogging force becomes larger in case of the use of the high-performance magnet indicated by the broken line curve than in case of the use of the low-performance magnet 60 indicated by the solid line curve. Likewise, the variation of the cogging force becomes larger in case of the use of the high-performance magnet than in case of the use of the low-performance magnet 60.

The vibrating body 40 is vibrated under the influence of the thrust force and the cogging force acting on the magnet 60. As shown in FIG. 5, the thrust force becomes gradually smaller as the vibrating body 40 moves from the amplitude center to each of the maximum amplitude positions. In contrast, as shown in FIG. 6, the cogging force grows larger as the vibrating body 40 moves from the amplitude center to the middle portion C. As indicated by the broken line curve in FIG. 6, if the high-performance magnet is used, the cogging force becomes larger and the variation of the cogging force also grows larger. For that reason, the vibrating body 40 is heavily affected by the cogging force at or around the middle portion C. On the other hand, if the low-performance magnet 60 is used, the cogging force becomes smaller and the variation of the cogging force also grows smaller. For that reason, the vibrating body 40 is more heavily affected by the thrust force than by the variation of the cogging force.

Figure 7:
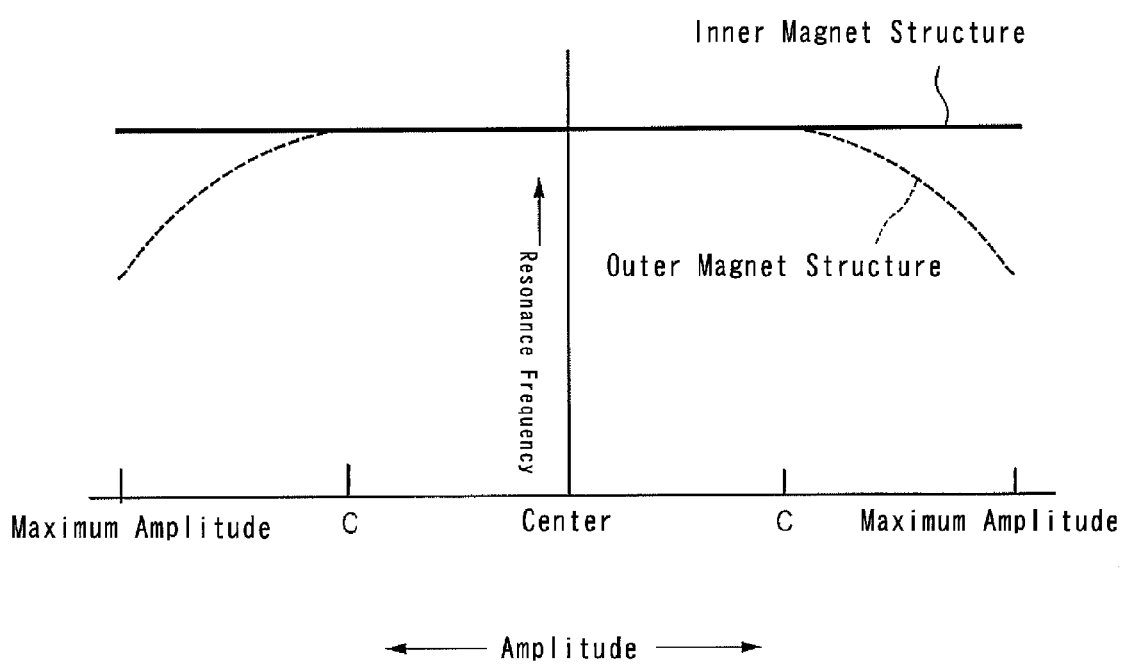
FIG. 7 is a graph representing the relationship between the resonance frequency and the amplitude of the vibrating body, which compares an inner magnet structure with an outer magnet structure.

FIG. 7 is a graph representing how the cogging force and the variation of the cogging force will affect the resonance frequency of the vibrating body 40. In FIG. 7, the horizontal axis indicates the amplitude of the vibrating body 40 and the vertical axis indicates the resonance frequency. The center of the horizontal axis indicates the amplitude center. The opposite ends of the horizontal axis indicate the maximum amplitude positions. The broken line curve indicates the relationship between the amplitude of the vibrating body 40 and the resonance frequency when the magnetic circuit is formed into an outer magnet structure through the use of a high-performance magnet. The solid line curve indicates the relationship between the amplitude of the vibrating body 40 and the resonance frequency when the magnetic circuit is formed into an inner magnet structure through the use of a low-performance magnet 60.

In the outer magnet structure, as indicated by the broken line curve, the resonance frequency is constant in the region extending from the amplitude center to the middle portion C between the amplitude center and each of the maximum amplitude positions. However, the resonance frequency becomes gradually lower in the region extending from the middle portion C to each of the maximum amplitude positions. For that reason, the vibrating body 40 does not resonate and the amplitude thereof becomes smaller in the region extending from the middle portion C to each of the maximum amplitude positions. In contrast, in the inner magnet structure, the resonance frequency is kept constant in the entire region. For that reason, it becomes possible to maintain the amplitude as desired.

As described above, the volumes of the coil 20 and the magnet 60 can be increased in the inner magnet structure in which the magnet 60 is arranged radially inward of the coil 20. The performance of a magnet can be lowered by increasing the volumes of the coil 20 and the magnet 60. The low-performance magnet 60 is capable of maintaining the resonance frequency constant. Accordingly, the inner magnet structure can easily control the vibration of the vibrating body 40.

Second Embodiment

Figure 8:
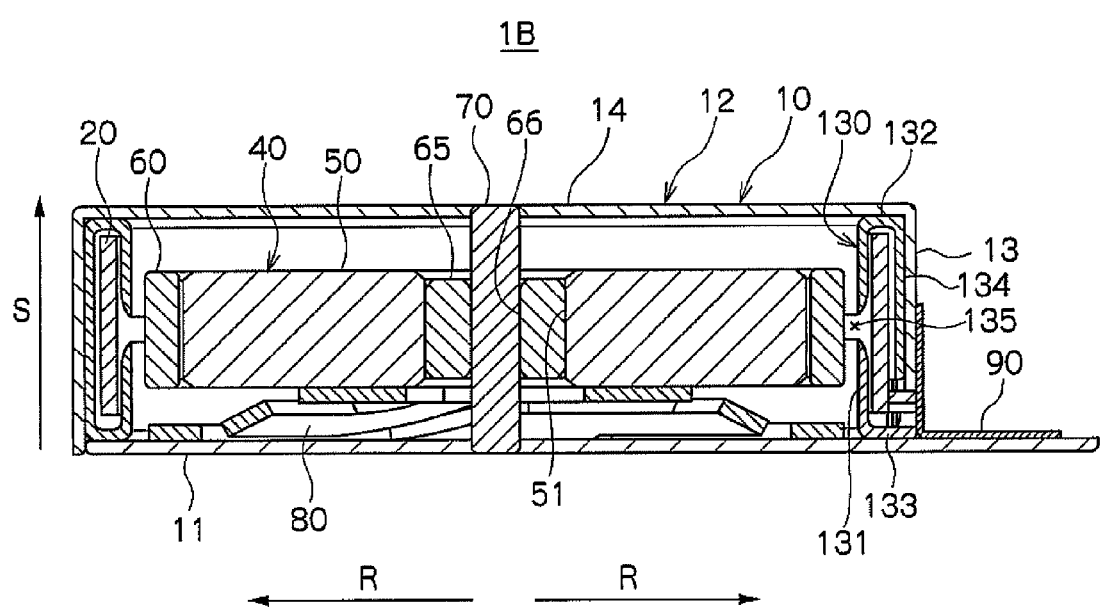
FIG. 8 is a vertical section view showing an internal structure of a vibration generator according to a second preferred embodiment of the present invention.

A vibration generator 1B according to a second preferred embodiment of the present invention will be described in detail with reference to FIG. 8. The vibration generator 1B of the second embodiment differs from the vibration generator 1A of the first embodiment only in terms of the configuration of a yoke 130 and remains the same as the vibration generator 1A of the first embodiment in other configurations. Therefore, the same configurations as those of the vibration generator 1A of the first embodiment will be designated by like reference symbols and will be described just briefly. Detailed description will be made on only the differing configurations. The radius direction of the vibration generator 1B designated by reference symbol R in FIG. 8 is a radial direction. The height direction of the vibration generator 1B designated by reference symbol S in FIG. 8 is a thrust direction.

The vibration generator 1B preferably includes a housing 10 composed of an end plate 11 and a case 12. The case 12 is one-piece formed by an annular peripheral wall surface 13 surrounding the periphery of the vibration generator 1B and a top surface 14 covering the top portion of the vibration generator 1B. The case 12 is made of a non-magnetic material.

Within the housing 10, there are accommodated an annular coil 20 arranged to generate magnetic fields, a yoke 130 arranged to cover an inner circumferential surface, an outer circumferential surface, an upper end portion and a lower end portion of the coil 20 and to amplify an electromagnetic force generated by the magnetic fields in cooperation with the coil 20, a vibrating body 40 arranged radially inward of the coil 20, a shaft 70 arranged at a radial center of the vibration generator 1B and a spring 80 arranged to support the vibrating body 40 in the thrust direction.

The coil 20 is formed into an annular shape and is arranged inside the peripheral wall surface 13 of the case 12 with a minute gap left between the coil 20 and the peripheral wall surface 13. The coil 20 is formed to have a reduced thickness. The thrust-direction dimension of the coil 20 is a little smaller than the thrust-direction dimension of the case 12.

The yoke 130 is made of a thin magnetic material. In cooperation with the coil 20, the yoke 30 amplifies the electromagnetic force generated by the magnetic fields. The yoke 130 is formed to have an annular contour. The yoke 130 preferably includes an inner peripheral wall 131 covering the inner circumferential surface of the coil 20, an outer peripheral wall 134 covering the outer circumferential surface of the coil 20, an upper end surface portion 132 arranged near the top surface 14 of the case 12 to cover the portion of the coil 20 facing toward the top surface 14 and a lower end surface portion 133 arranged near the end plate 11 to cover the portion of the coil 20 facing toward the end plate 11. An opening portion 135 interconnecting a radial inner side and a radial outer side of the inner peripheral wall 131 is formed at the thrust-direction center of the inner peripheral wall 131. The opening portion 135 is formed over the entire circumference of the yoke 130. The upper end surface portion 132 and the lower end surface portion 133 of the yoke 130 are interposed between the end plate 11 and the top surface 14 of the case 12, whereby the yoke 130 is fixed in a specified position.

Since the coil 20 and the yoke 130 are configured as above, the yoke 130 is formed into a compact shape by a thin flat magnetic material.

The shaft 70 is arranged at the radial center. The axial direction of the shaft 70 extends in the thrust direction. The shaft 70 serves to keep horizontal the posture of the vibrating body 40 when the vibrating body 40 vibrates in the thrust direction.

The vibrating body 40 preferably includes a weight 50, a magnet 60 arranged in the outer peripheral portion of the weight 50 and a bearing 65 arranged at the radial center of the weight 50. The weight 50 is formed into a disc shape to have a specified thickness. The magnet 60 is formed into an annular shape and is fitted to the outer peripheral portion of the weight 50. The thrust-direction dimension of the magnet 60 is smaller than the thrust-direction dimension of the yoke 130. An attachment hole 51 is defined at the radial center of the weight 50. The bearing 65 is fitted into the attachment hole 51. A slide hole 66 extending in the thrust direction is defined at the radial center of the bearing 65. The shaft 70 is inserted through the slide hole 66.

The spring 80 is formed by spirally winding a flat spring material. The spring 80 is a volute spring having a truncated conical contour. The radial outer portion of the spring 80 is fixed to the end plate 11. The central portion of the spring 80 is arranged on the vibrating body 40. The supporting structure of the vibrating body 40 is a cantilever structure in which the vibrating body 40 is supported only at the side of the end plate 11 by the spring 80.

When supported by the spring 80, the vibrating body 40 is positioned at the amplitude center in the thrust direction. If the vibrating body 40 is supported by the spring 80, the thrust-direction center of the magnet 60 comes into alignment with the position of the opening portion 135 formed in the yoke 130.

A connecting portion 90 is arranged outside the housing 10 of the vibration generator 1B (see FIG. 3).

Third Embodiment

Figure 9:
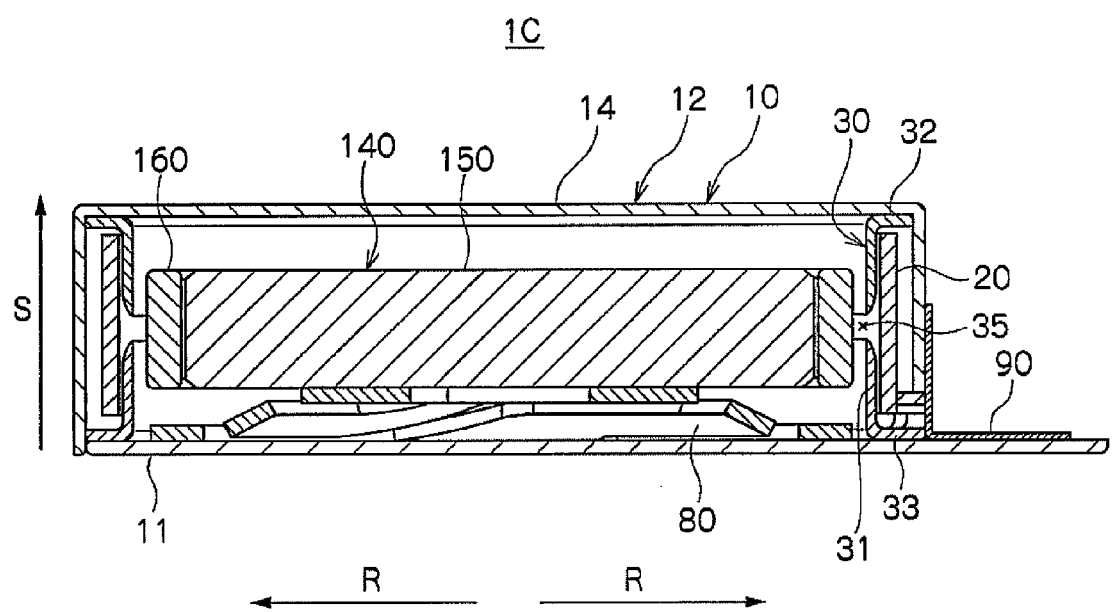
FIG. 9 is a vertical section view showing an internal structure of a vibration generator according to a third preferred embodiment of the present invention.

A vibration generator 1C according to a third preferred embodiment of the present invention will be described in detail with reference to FIG. 9. The vibration generator 1C of the third embodiment remains the same as the vibration generator 1A of the first embodiment except the omission of a shaft 70 and the difference in the configuration of a vibrating body 140. Therefore, the same configurations as those of the vibration generator 1A of the first embodiment will be designated by like reference symbols and will be described just briefly. Detailed description will be made on only the differing configurations. The radius direction of the vibration generator 1C designated by reference symbol R in FIG. 9 is a radial direction. The height direction of the vibration generator 1C designated by reference symbol S in FIG. 9 is a thrust direction.

The vibration generator 1C preferably includes a housing 10 composed of an end plate 11 and a case 12. The case 12 is one-piece formed by an annular peripheral wall surface 13 surrounding the periphery of the vibration generator 1C and a top surface 14 covering the top portion of the vibration generator 1C. The case 12 is made of a non-magnetic material.

Within the housing 10, there are accommodated an annular coil 20 arranged to generate magnetic fields, a yoke 30 arranged to cover an inner circumferential surface, an upper end portion and a lower end portion of the coil 20 and to amplify an electromagnetic force generated by the magnetic fields in cooperation with the coil 20, a vibrating body 140 arranged radially inward of the coil 20, and a spring 80 arranged to support the vibrating body 140 in the thrust direction.

The coil 20 is arranged inside the peripheral wall surface 13 of the case 12 with a minute gap left between the coil 20 and the peripheral wall surface 13. The yoke 30 is formed to have an annular contour. The yoke 30 preferably includes an inner peripheral wall 31 covering the inner surface of the coil 20, an upper end surface portion 32 arranged near the top surface 14 of the case 12 to extend from the end portion of the inner peripheral wall 31 toward the peripheral wall surface 13 and a lower end surface portion 33 arranged near the end plate 11 to extend from the end portion of the inner peripheral wall 31 toward the peripheral wall surface 13. The yoke 30 has an opening portion 35 formed at the thrust-direction center of the inner peripheral wall 31. The opening portion 35 is formed over the entire circumference of the yoke 30. The upper end surface portion 32 and the lower end surface portion 33 of the yoke 30 are interposed between the end plate 11 and the top surface 14 of the case 12.

The vibrating body 140 preferably includes a weight 150 and a magnet 160 arranged in the outer peripheral portion of the weight 150.

The weight 150 is formed into a disc shape to have a specified thickness. The vibrating body 140 is not supported by a shaft in the thrust direction. For that reason, no attachment hole 51 is formed at the radial center of the weight 150. The thickness-direction dimension of the weight 150 is smaller than the thrust-direction dimension of the yoke 30.

The weight 150 is formed to have a desired weight depending on the kinds of portable terminals employing the vibration generator 1C.

The magnet 160 is formed into an annular shape and is fitted to the outer peripheral portion of the weight 150. The outer circumferential surface of the magnet 160 is opposed to the inner peripheral wall 31 of the yoke 30. The outer circumferential surface of the magnet 160 is opposed to the coil 20 across the inner peripheral wall 31 of the yoke 30. The thrust-direction dimension of the magnet 160 is smaller than the thrust-direction dimension of the yoke 30 and is equal to or substantially equal to the thickness of the weight 150.

The spring 80 is formed by spirally winding a flat spring material. The spring 80 is a volute spring having a truncated conical contour. The radial outer portion of the spring 80 is fixed to the end plate 11. The central portion of the spring 80 is arranged on the vibrating body 140. The supporting structure of the vibrating body 140 is a cantilever structure in which the vibrating body 140 is supported only at the side of the end plate 11 by the spring 80.

When supported by the spring 80, the vibrating body 140 is positioned at the amplitude center. If the vibrating body 140 is supported by the spring 80, the thrust-direction center of the magnet 160 comes into alignment with the position of the opening portion 35 formed in the yoke 30.

A connecting portion 90 is arranged outside the housing 10 of the vibration generator 1C (see FIG. 3).

Fourth Embodiment

Figure 10:
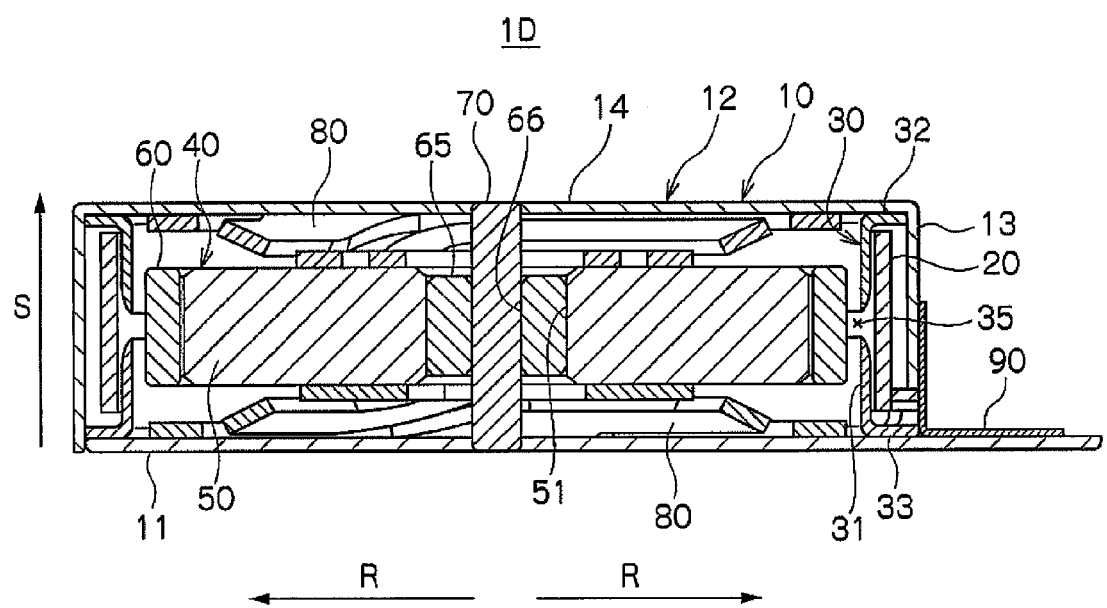
FIG. 10 is a vertical section view showing an internal structure of a vibration generator according to a fourth preferred embodiment of the present invention.

A vibration generator 1D according to a fourth preferred embodiment of the present invention will be described in detail with reference to FIG. 10. The vibration generator 1D of the fourth embodiment is configured such that the vibrating body 40 is supported by springs 80 at the thrust-direction opposite sides thereof. The vibration generator 1D of the fourth embodiment remains the same as the vibration generator 1A of the first embodiment except that the vibrating body 40 is supported by the springs 80. Therefore, the same configurations as those of the vibration generator 1A of the first embodiment will be designated by like reference symbols and will be described just briefly. Detailed description will be made on only the differing configurations. The radius direction of the vibration generator 1D designated by reference symbol R in FIG. 10 is a radial direction. The height direction of the vibration generator 1D designated by reference symbol S in FIG. 10 is a thrust direction.

The vibration generator 1D preferably includes a housing 10 composed of an end plate 11 and a case 12. The case 12 is one-piece formed by an annular peripheral wall surface 13 surrounding the periphery of the vibration generator 1D and a top surface 14 covering the top portion of the vibration generator 1D. The case 12 is made of a magnetic material.

Within the housing 10, there are accommodated an annular coil 20 arranged to generate magnetic fields, a yoke 30 arranged on an inner circumferential surface of the coil 20 to amplify an electromagnetic force generated by the magnetic fields in cooperation with the coil 20, a vibrating body 40 arranged radially inward of the coil 20, a shaft 70 arranged at a radial center of the vibration generator 1D and two springs 80 arranged to support the vibrating body 40 in the thrust direction.

The coil 20 is arranged inside the peripheral wall surface 13 of the case 12 with a minute gap left between the coil 20 and the peripheral wall surface 13. The yoke 30 is formed to have an annular contour. The yoke 30 preferably includes an inner peripheral wall 31 covering the inner surface of the coil 20, an upper end surface portion 32 arranged near the top surface 14 of the case 12 to extend from the end portion of the inner peripheral wall 31 toward the peripheral wall surface 13 and a lower end surface portion 33 arranged near the end plate 11 to extend from the end portion of the inner peripheral wall 31 toward the peripheral wall surface 13. The yoke 30 has an opening portion 35 formed at the thrust-direction center of the inner peripheral wall 31. The opening portion 35 is formed over the entire circumference of the yoke 30. The upper end surface portion 32 and the lower end surface portion 33 of the yoke 30 are interposed between the end plate 11 and the top surface 14 of the case 12.

The shaft 70 is arranged at the radial center of the housing 10. The axial direction of the shaft 70 extends in the thrust direction. One axial end of the shaft 70 is arranged in the end plate 11. The other axial end of the shaft 70 is attached to the top surface 14 of the case 12. The shaft 70 serves to keep horizontal the posture of the vibrating body 40 when the vibrating body 40 vibrates in the thrust direction.

The vibrating body 40 preferably includes a weight 50, a magnet 60 arranged in the outer peripheral portion of the weight 50 and a bearing 65 arranged at the radial center of the weight 50. The weight 50 is formed into a disc shape to have a specified thickness. The magnet 60 is formed into an annular shape and is fitted to the outer peripheral portion of the weight 50. The thrust-direction dimension of the magnet 60 is smaller than the thrust-direction dimension of the yoke 30. An attachment hole 51 is defined at the radial center of the weight 50. The bearing 65 is fitted into the attachment hole 51. A slide hole 66 is defined at the radial center of the bearing 65. The shaft 70 is inserted through the slide hole 66.

The springs 80 are respectively arranged at the thrust-direction opposite sides of the vibrating body 40. Each of the springs 80 is formed by spirally winding a flat spring material. Each of the springs 80 is a volute spring having a truncated conical contour.

The radial outer portion of one of the springs 80 is fixed to the end plate 11. The central portion thereof is arranged on one surface of the vibrating body 40. The radial outer portion of the other spring 80 is fixed to the top surface 14 of the case 12. The central portion thereof is arranged on the other surface of the vibrating body 40. The supporting structure of the vibrating body 40 is a straddling lever structure in which the vibrating body 40 is supported by the springs 80 at the side of the end plate 11 and at the side of the top surface 14 of the case 12. The two springs 80 are identical in the spring constant, the dimension and other characteristics with each other. For that reason, the vibrating body 40 can vibrate toward the end plate 11 and the top surface 14 of the case 12 in a well-balanced manner.

When supported by the two springs 80, the vibrating body 40 is positioned at the amplitude center in the thrust direction. If the vibrating body 40 is supported by the springs 80, the thrust-direction center of the magnet 60 comes into alignment with the position of the opening portion 35 formed in the yoke 30.

A connecting portion 90 is arranged outside the housing 10 of the vibration generator 1D (see FIG. 3).

Fifth Embodiment

Figure 11:
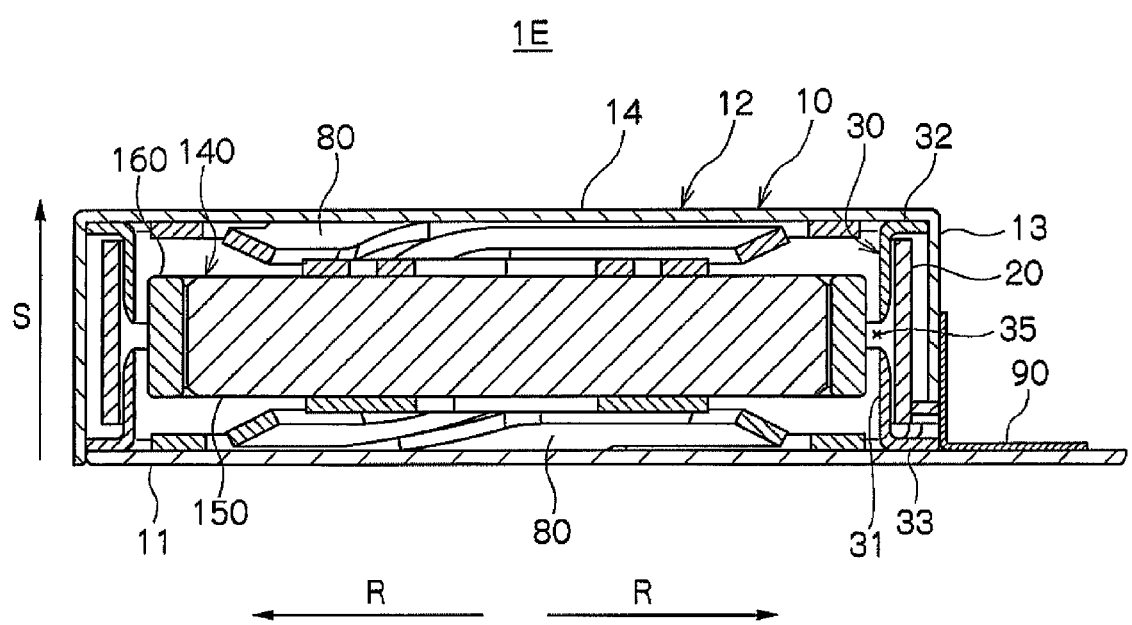
FIG. 11 is a vertical section view showing an internal structure of a vibration generator according to a fifth preferred embodiment of the present invention.

A vibration generator 1E according to a fifth preferred embodiment of the present invention will be described in detail with reference to FIG. 11. The vibration generator 1E of the fifth embodiment remains the same as the vibration generator 1C of the third embodiment except the supporting structure of the vibrating body 140. Therefore, the same configurations as those of the vibration generator 1C of the third embodiment will be designated by like reference symbols and will be described just briefly. Detailed description will be made on only the differing configurations. The radius direction of the vibration generator 1E designated by reference symbol R in FIG. 11 is a radial direction. The height direction of the vibration generator 1E designated by reference symbol S in FIG. 11 is a thrust direction.

The vibration generator 1E preferably includes a housing 10 composed of an end plate 11 and a case 12. The case 12 is one-piece formed by an annular peripheral wall surface 13 surrounding the periphery of the vibration generator 1E and a top surface 14 covering the top portion of the vibration generator 1E. The case 12 is made of a magnetic material.

Within the housing 10, there are accommodated an annular coil 20 arranged to generate magnetic fields, a yoke 30 arranged on an inner circumferential surface of the coil 20 to amplify an electromagnetic force generated by the magnetic fields in cooperation with the coil 20, a vibrating body 140 arranged radially inward of the coil 20, and two springs 80 arranged to support the vibrating body 140 in the thrust direction.

The coil 20 is formed into an annular shape. The coil 20 is arranged inside the peripheral wall surface 13 of the case 12 with a minute gap left between the coil 20 and the peripheral wall surface 13. The yoke 30 is formed to have an annular contour. The yoke 30 preferably includes an inner peripheral wall 31 covering the inner surface of the coil 20, an upper end surface portion 32 arranged near the top surface 14 of the case 12 to extend from the end portion of the inner peripheral wall 31 toward the peripheral wall surface 13 and a lower end surface portion 33 arranged near the end plate 11 to extend from the end portion of the inner peripheral wall 31 toward the peripheral wall surface 13. The yoke 30 has an opening portion 35 formed at the thrust-direction center of the inner peripheral wall 31. The opening portion 35 is formed over the entire circumference of the yoke 30. The upper end surface portion 32 and the lower end surface portion 33 of the yoke 30 are interposed between the end plate 11 and the top surface 14 of the case 12.

The vibrating body 140 preferably includes a weight 150 and a magnet 160 arranged in the outer peripheral portion of the weight 150. The weight 150 is formed into a disc shape to have a specified thickness. The vibrating body 140 is not supported by a shaft 70 in the thrust direction. For that reason, no attachment hole 51 is formed at the radial center of the weight 150. The magnet 160 is formed into an annular shape and is fitted to the outer circumferential surface of the weight 150. The thrust-direction dimension of the magnet 160 is smaller than the thrust-direction dimension of the yoke 30.

The springs 80 are respectively arranged at the thrust-direction opposite sides of the vibrating body 140. Each of the springs 80 is formed by spirally winding a flat spring material. Each of the springs 80 is a volute spring having a truncated conical contour.

The radial outer portion of one of the springs 80 is fixed to the end plate 11. The central portion thereof is arranged on one surface of the vibrating body 140. The radial outer portion of the other spring 80 is fixed to the top surface 14 of the case 12. The central portion thereof is arranged on the other surface of the vibrating body 140. The supporting structure of the vibrating body 140 is a straddling lever structure in which the vibrating body 140 is supported by the springs 80 at the side of the end plate 11 and at the side of the top surface 14 of the case 12. The two springs 80 are identical in the spring constant, the dimension and other characteristics with each other.

For that reason, the vibrating body 140 can vibrate toward the end plate 11 and the top surface 14 of the case 12 in a well-balanced manner.

When supported by the two springs 80, the vibrating body 140 is positioned at the amplitude center in the thrust direction. If the vibrating body 140 is supported by the springs 80, the thrust-direction center of the magnet 160 comes into alignment with the position of the opening portion 35 formed in the yoke 30.

A connecting portion 90 is arranged outside the housing 10 of the vibration generator 1E (see FIG. 3).

The vibration generators 1C, 1D and 1E of the third through fifth embodiments described above includes the yoke 30 having the same configuration as the yoke 30 of the vibration generator 1A of the first embodiment. Alternatively, the vibration generators 1C, 1D and 1E of the third through fifth embodiments may employ a yoke 130 having the same configuration as the yoke 130 of the vibration generator 1B of the second embodiment.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A vibration generator, comprising:
 a coil arranged to generate magnetic fields, the coil including a lead wire;
 a ring-shaped yoke arranged to amplify an electromagnetic force generated by the magnetic fields in cooperation with the coil;
 a vibrating body arranged radially inward of the coil to move in a thrust direction;
 a ring-shaped magnet arranged in an outer peripheral portion of the vibrating body and opposed to the coil;
 a spring arranged to support the vibrating body on only one side, and
 a housing having a first hole to connect an inside thereof with an outside thereof, wherein the coil, the ring-shaped yoke, the vibrating body, the ring-shaped magnet and the spring are accommodated in the inside;
 wherein the lead wire passes through the first hole to be extended to the outside in a radial direction of the ring-shaped yoke.

2. The vibration generator of claim 1, further comprising:
 a peripheral wall surface arranged radially outward of the coil to surround a periphery of the coil,
 wherein the yoke includes an inner peripheral wall covering an inner circumferential surface of the coil and a pair of end surface portions extending from opposite sides of the inner peripheral wall in the thrust-direction toward the peripheral wall surface, the end surface portions making contact with the peripheral wall surface, the inner peripheral wall including an opening portion arranged to interconnect a radial inner side and a radial outer side of the inner peripheral wall, the opening portion formed over an entire circumference of the inner peripheral wall in a position corresponding to a center of amplitude of the vibrating body.

3. The vibration generator of claim 1, wherein the yoke includes an inner peripheral wall covering an inner circumferential surface of the coil, an outer peripheral wall covering an outer circumferential surface of the coil and a pair of end surface portions arranged at opposite ends of the yoke in the thrust-direction to interconnect the inner peripheral wall and the outer peripheral wall, the inner peripheral wall including an opening portion arranged to interconnect a radial inner side and a radial outer side of the inner peripheral wall, the opening portion formed over an entire circumference of the inner peripheral wall in a position corresponding to a center of amplitude of the vibrating body.

4. The vibration generator of claim 2, further comprising:
a housing including an end plate serving as a bottom surface and a case capped on the end plate, the case including the peripheral wall surface arranged radially outward of the coil and a top surface arranged to cover a top portion of the vibration generator, the end surface portions of the yoke interposed between the end plate and the top surface of the case.

5. The vibration generator of claim 3, further comprising:
a housing including an end plate serving as a bottom surface and a case capped on the end plate, the case including a peripheral wall surface arranged radially outward of the coil and a top surface arranged to cover a top portion of the vibration generator, the end surface portions of the yoke interposed between the end plate and the top surface of the case.

6. The vibration generator of claim 1, wherein a thrust-direction dimension of the yoke is larger than a thrust-direction dimension of the magnet.

7. The vibration generator of claim 2, wherein a thrust-direction dimension of the yoke is larger than a thrust-direction dimension of the magnet.

8. The vibration generator of claim 3, wherein a thrust-direction dimension of the yoke is larger than a thrust-direction dimension of the magnet.

9. The vibration generator of claim 1, further comprising:
a shaft extending in the thrust direction, the vibrating body arranged to slide along the shaft in the thrust direction.

10. The vibration generator of claim 2, further comprising:
a shaft extending in the thrust direction, the vibrating body arranged to slide along the shaft in the thrust direction.

11. The vibration generator of claim 3, further comprising:
a shaft extending in the thrust direction, the vibrating body arranged to slide along the shaft in the thrust direction.

12. The vibration generator of claim 1, wherein the lead wire passing through the first hole to be extended to the outside in the radial direction of the ring-shaped yoke is connected to a flexible printed circuit.

13. The vibration generator of claim 1, further comprising a case attached to the outside of the housing 10 in the radial direction of the ring-shaped yoke, the case having a second hole,
wherein the lead wire passing through the first hole and the second hole to be extended to the outside in the radial direction of the ring-shaped yoke is connected to a flexible printed circuit.

* * * * *